(12) United States Patent
Huang et al.

(10) Patent No.: US 10,531,311 B2
(45) Date of Patent: Jan. 7, 2020

(54) UPLINK ACCESS METHOD, USER EQUIPMENT, AND BASE STATION

(71) Applicant: HUAWEI TECHNOLOGIES CO., LTD., Shenzhen, Guangdong (CN)

(72) Inventors: Lei Huang, Shanghai (CN); Yi Wang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/972,969

(22) Filed: May 7, 2018

(65) Prior Publication Data
US 2018/0255468 A1    Sep. 6, 2018

Related U.S. Application Data

(63) Continuation of application No. PCT/CN2016/100767, filed on Sep. 29, 2016.

(30) Foreign Application Priority Data
Nov. 26, 2015  (CN) .......................... 2015 1 0843971

(51) Int. Cl.
  *H04W 16/28*    (2009.01)
  *H04W 72/04*    (2009.01)
  *H04W 74/08*    (2009.01)

(52) U.S. Cl.
  CPC ....... *H04W 16/28* (2013.01); *H04W 72/0413* (2013.01); *H04W 72/0446* (2013.01); *H04W 74/0833* (2013.01)

(58) Field of Classification Search
  CPC ............. H04W 16/28; H04W 74/0833; H04W 72/0413; H04W 72/0446; H04W 74/08; H04W 72/04
  See application file for complete search history.

(56) References Cited

U.S. PATENT DOCUMENTS

2011/0075642 A1    3/2011    Cordeiro et al.
2013/0072244 A1    3/2013    Jeong et al.
(Continued)

FOREIGN PATENT DOCUMENTS

| CN | 102036410 A | 4/2011 |
|---|---|---|
| CN | 103891161 A | 6/2014 |

(Continued)

OTHER PUBLICATIONS

Huawei Technologies 3GPP RAN workshop on 5G Vision on 5G Radio Access Technologies RWS—150006, Sep. 18, 2015, 18 pages.
(Continued)

*Primary Examiner* — Brian D Nguyen
(74) *Attorney, Agent, or Firm* — Fish & Richardson P.C.

(57) ABSTRACT

This application discloses an uplink access method, a base station, and user equipment. The method of this application includes: in a process in which user equipment performs initial random access to a high-frequency base station, allocating, by the high-frequency base station, a non-contention-based sequence to the user equipment, and sending the non-contention-based sequence to the user equipment by using a first random access response message; after the user equipment completes the initial random access to the high-frequency base station and in a periodical beam training process, determining, by the high-frequency base station, an optimal receiving wide beam of the high-frequency base station and an optimal sending narrow beam of the user equipment by detecting, on each receiving wide beam of the high-frequency base station, the non-contention-based sequence sent by the user equipment; and sending, by the high-frequency base station, a second random access response message to the user equipment.

14 Claims, 9 Drawing Sheets

(56) References Cited

U.S. PATENT DOCUMENTS

| | | |
|---|---|---|
| 2013/0102345 A1 | 4/2013 | Jung |
| 2013/0121185 A1 | 5/2013 | Li et al. |
| 2013/0272220 A1 | 10/2013 | Li et al. |
| 2013/0301567 A1 | 11/2013 | Jeong et al. |
| 2014/0010178 A1 | 1/2014 | Yu et al. |
| 2014/0016573 A1 | 1/2014 | Nuggehalli et al. |
| 2014/0254515 A1 | 9/2014 | Kim et al. |
| 2015/0004918 A1 | 1/2015 | Wang et al. |
| 2015/0305047 A1* | 10/2015 | Cheng .............. H04W 24/02 370/248 |
| 2016/0262179 A1* | 9/2016 | Choi .............. H04W 76/10 |
| 2016/0286580 A1* | 9/2016 | Liu .............. H04W 74/006 |
| 2016/0345326 A1* | 11/2016 | Yerramalli ....... H04W 72/0453 |
| 2017/0033851 A1 | 2/2017 | Zhong et al. |
| 2017/0238345 A1* | 8/2017 | Liu .............. H04W 74/08 370/329 |
| 2018/0132273 A1* | 5/2018 | Zhang .............. H04W 74/004 |
| 2018/0176957 A1* | 6/2018 | Zhang .............. H04L 1/00 |

FOREIGN PATENT DOCUMENTS

| | | |
|---|---|---|
| CN | 104734759 A | 6/2015 |
| KR | 101563469 B1 | 10/2015 |
| WO | 2014124048 A1 | 8/2014 |
| WO | 2015090353 A1 | 6/2015 |

OTHER PUBLICATIONS

International Search Report issued in International Application No. PCT/CN2016/100767 dated Dec. 23, 2016, 18 pages.

Extended European Search Report issued in European Application No. 16867812.6 dated Oct. 22, 2018, 8 pages.

JP Office Action in Japanese Application No. 2018-527142, dated Mar. 19, 2019, 5 pages (with English translation).

* cited by examiner

UPLINK ACCESS METHOD, USER EQUIPMENT, AND BASE STATION

CROSS-REFERENCE TO RELATED APPLICATIONS

This application is a continuation of International Application No. PCT/CN2016/100767, filed on Sep. 29, 2016, which claims priority to Chinese Patent Application No. 201510843971.7, filed on Nov. 26, 2015, The disclosures of the aforementioned applications are hereby incorporated by reference in their entireties.

TECHNICAL FIELD

The present invention relates to the field of communications technologies, and in particular, to an uplink access method, user equipment, and a base station.

BACKGROUND

Currently, as requirements on a data transmission rate, communication quality, and the like of mobile communication constantly increase, an existing frequency band used for mobile communication has become extremely congested. However, in a 6-300 GHz millimeter-wave frequency band, a large quantity of spectrum resources have not been allocated for use. Introducing a millimeter-wave frequency band into cellular access communication to make full use of a high bandwidth resource of the millimeter-wave frequency band is one of important research directions of a next-generation 5G (5th Generation) mobile communications technology.

In an existing research, a high frequency band represented by the millimeter-wave frequency band is mainly applied to an indoor short range communications scenario. In an outdoor scenario, because of features such as a complex terrain, a relatively high path loss of the high frequency band, a weak capability of penetrating an obstacle, and a severe rain fade at some frequencies, application of the high frequency band in the outdoor scenario is seriously limited. However, because the high frequency band has a short wavelength and can be easily used to implement a large-scale array antenna, the high frequency band may bring a large directional antenna gain by using a beamforming technology, so as to effectively compensate for the high path loss of the high frequency band. This also provides a possibility for application of the high frequency band in intermediate and long distance transmission in the outdoor scenario.

Generally, a base station applied in a high-frequency communications system is referred to as a high-frequency base station, and a base station applied in a low-frequency communications system is referred to as a low-frequency base station. In the high-frequency communications system, both a high-frequency base station and user equipment can use a large-scale antenna array to perform beamforming. Directional beams (wide beams or narrow beams) of different widths may be formed by adjusting phases or amplitudes of each antenna unit, and/or digital weighted vectors on a plurality of radio frequency (Radio Frequency, RF for short) channels.

Each random access process defined in a current Long Term Evolution (Long Term Evolution, LTE for short) system is based on an omnidirectional beam, but in the high-frequency communications system, a directional beam is needed. Therefore, the LTE random access process cannot be directly used in the high-frequency communications system, and further improvement or a new design needs to be performed according to a feature of a high-frequency directional antenna.

In the existing solution, a random access process in the LTE system is extended to the high-frequency communications system, and transmitting/receiving directional beam pairs are traversed to achieve an omnidirectional antenna transmitting/receiving effect. In addition, an optimal transmission directional beam pair is obtained. After random access fails, a transmit power and a beam width that are used for retransmitting a random access signal may be adjusted to increase a success rate of the random access and extend a coverage area of uplink access.

However, in the high-frequency communications system, the high path loss brought by the high frequency band needs to be compensated for by using a high beam gain brought by an antenna array. The high beam gain is obtained based on beam alignment on a receive end and a transmit end. Once beam misalignment occurs on the receive end and the transmit end, quality of a received signal sharply declines, and normal data communication is interrupted. Therefore, in the high-frequency communications system, to ensure normal data communication, beam training needs to be periodically or aperiodically performed, so that the receive end and the transmit end can use an optimal transmitting/ receiving beam pair to perform data transmission. However, in the foregoing prior art, only an initial random access process in the high-frequency communications system is considered, and the initial random access process is not considered in combination with a subsequent beam training process.

SUMMARY

This application provides an uplink access method, user equipment, and a base station, so as to control system overheads, ensure precision of beam training, and therefore improve performance of a high-frequency communications system.

According to a first aspect, a high-frequency base station is provided, including:

an initial random access unit, configured to: in a process in which user equipment performs initial random access to a high-frequency base station, allocate a non-contention-based sequence to the user equipment, and send the non-contention-based sequence to the user equipment by using a first random access response message;

a beam training unit, configured to: after the user equipment completes the initial random access to the high-frequency base station and in a beam training process, determine an optimal receiving wide beam of the high-frequency base station and an optimal sending narrow beam of the user equipment by detecting, on each receiving wide beam of the high-frequency base station, the non-contention-based sequence sent by the user equipment; and a sending unit, configured to send a second random access response message to the user equipment by using the optimal receiving wide beam of the high-frequency base station, where the second random access response message includes information about the optimal receiving wide beam of the high-frequency base station and the optimal sending narrow beam of the user equipment.

In the process in which the user equipment performs initial random access to the high-frequency base station, the initial random access unit allocates the non-contention-based sequence to the user equipment, and sends the non-contention-based sequence to the user equipment by using the first random access response message. After the user equipment completes the initial random access to the high-frequency base station and in the beam training process, the beam training unit switches between receiving wide beams and detects the non-contention-based sequence sent by the user equipment, to determine the optimal receiving wide beam of the high-frequency base station and the optimal sending narrow beam of the user equipment. The sending unit sends the second random access response message including an optimal receiving wide beam of the high-frequency base station and an optimal sending narrow beam of the user equipment that are re-determined by the high-frequency base station to the user equipment. In the entire process, initial random access and subsequent beam training of the user equipment can be implemented on a random access resource of a high-frequency communications system. This controls system overheads and ensures precision of beam training, thereby improving performance of the high-frequency communications system.

With reference to the first aspect, in a first possible implementation of the first aspect, the beam training unit is specifically configured to:

detect, on each receiving wide beam of the high-frequency base station, the non-contention-based sequence sent by the user equipment;

determine that a receiving wide beam of the high-frequency base station that is corresponding to the non-contention-based sequence with a highest received signal strength is the optimal receiving wide beam of the high-frequency base station; and determine that a sending narrow beam corresponding to the optimal receiving wide beam of the high-frequency base station is the optimal sending narrow beam of the user equipment.

In this way, the beam training unit may determine the optimal receiving wide beam of the high-frequency base station and the optimal sending narrow beam of the user equipment by detecting the non-contention-based sequence sent by the user equipment, and combines an initial random access process with the beam training process by using the non-contention-based sequence. This ensures precision of beam training, thereby improving performance of the high-frequency communications system.

With reference to the first possible implementation of the first aspect, in a second possible implementation of the first aspect, the beam training unit is specifically configured to: detect, in an uplink random access/beam-training period ULBP of a special subframe of a radio frame and on each receiving wide beam of the high-frequency base station, the non-contention-based sequence sent by the user equipment, where at least one special subframe is preset in the radio frame, and at least one ULBP is reserved in the special subframe to receive a preamble sequence.

In this case, the beam training unit detects the non-contention-based sequence in the ULBP reserved in the set special subframe. This achieves appropriate use of resources and reduces system overheads.

With reference to the first possible implementation of the first aspect or the second possible implementation of the first aspect, in a third possible implementation of the first aspect, in the beam training process and before the high-frequency base station detects the non-contention-based sequence sent by the user equipment, the sending unit is further configured to: send a synchronization signal to the user equipment by using different wide beams, so that the user equipment determines an optimal sending wide beam of the user equipment, sequentially switches, in time slices corresponding to different receiving wide beams of the high-frequency base station, between narrow beams in the optimal sending wide beam of the user equipment, and sends the non-contention-based sequence, where a receiving wide beam of the high-frequency base station is in a one-to-one correspondence with a time slice; and the beam training unit is specifically configured to: determine a target time slice corresponding to the optimal receiving wide beam of the high-frequency base station, and determine that a sending narrow beam used for sending the non-contention-based sequence in the target time slice is the optimal sending narrow beam of the user equipment.

Because a receiving wide beam of the high-frequency base station is in a one-to-one correspondence with a time slice, the beam training unit may further determine, by determining the target time slice corresponding to the optimal receiving wide beam of the high-frequency base station, that the sending narrow beam used for sending the non-contention-based sequence in the target time slice is the optimal sending narrow beam of the user equipment. This solution is easy to implement.

According to a second aspect, user equipment is provided, including:

an initial random access unit, configured to: in a process in which user equipment performs initial random access to a high-frequency base station, receive a first random access response message sent by the high-frequency base station, where the first random access response message includes a non-contention-based sequence allocated by the high-frequency base station to the user equipment;

a beam training unit, configured to: after the user equipment completes the initial random access to the high-frequency base station and in a beam training process, send the non-contention-based sequence to the high-frequency base station; and a receiving unit, configured to: receive a second random access response message sent by the high-frequency base station, where the second random access response message is sent to the user equipment when the high-frequency base station detects the non-contention-based sequence, the second random access response message includes information about an optimal receiving wide beam of the high-frequency base station and an optimal sending narrow beam of the user equipment, and the optimal receiving wide beam of the high-frequency base station and the optimal sending narrow beam of the user equipment are determined by the high-frequency base station by detecting, on each receiving wide beam, the non-contention-based sequence sent by the user equipment.

In the process in which the user equipment performs initial random access to the high-frequency base station, the initial random access unit receives the non-contention-based sequence allocated by the high-frequency base station. After the user equipment completes the initial random access to the high-frequency base station and in the beam training process, the beam training unit sends the non-contention-based sequence to the high-frequency base station, so that the high-frequency base station determines the optimal receiving wide beam of the high-frequency base station and the optimal sending narrow beam of the user equipment, and sends the optimal receiving wide beam of the high-frequency base station and the optimal sending narrow beam of the user equipment to the user equipment by using the second random access response message. The receiving unit receives the second random access response message sent by the high-frequency base station. In the entire process, initial random access and subsequent beam training of the user equipment can be implemented on a random access resource of a high-frequency communications system. This controls system overheads and ensures precision of beam training, thereby improving performance of the high-frequency communications system.

With reference to the second aspect, in a first possible implementation of the second aspect, the beam training unit is specifically configured to: determine an optimal receiving wide beam of the user equipment; and separately send the non-contention-based sequence to the high-frequency base station by using narrow beams in the optimal receiving wide beam of the user equipment.

The non-contention-based sequence is sent by using the narrow beams in the determined optimal receiving wide beam of the user equipment, and therefore, beam training is more accurate.

With reference to the first possible implementation of the second aspect, in a second possible implementation of the second aspect, the beam training unit is specifically configured to:

switch between receiving beams and perform synchronization signal detection to determine an optimal sending wide beam of the high-frequency base station and the optimal receiving wide beam of the user equipment, where the synchronization signal is sent by the high-frequency base station; and sequentially switch, in time slices corresponding to different receiving wide beams of the high-frequency base station, between narrow beams in the optimal receiving wide beam of the user equipment, and send the non-contention-based sequence, so that the high-frequency base station determines the optimal receiving wide beam of the high-frequency base station and the optimal sending narrow beam of the user equipment, where a receiving wide beam of the high-frequency base station is in a one-to-one correspondence with a time slice.

Because a receiving wide beam of the high-frequency base station is in a one-to-one correspondence with a time slice, the beam training unit sequentially switches, in the time slices corresponding to different receiving wide beams of the high-frequency base station, between narrow beams in the optimal receiving wide beam of the user equipment, and sends the non-contention-based sequence, so that the high-frequency base station may further determine, by determining the target time slice corresponding to the optimal receiving wide beam of the high-frequency base station, that the sending narrow beam used for sending the non-contention-based sequence in the target time slice is the optimal sending narrow beam of the user equipment. This solution is easy to implement.

With reference to the second possible implementation of the second aspect, in a third possible implementation of the second aspect, the beam training unit is specifically configured to: sequentially switch, in a ULBP of a special subframe of a radio frame and in a time slice corresponding to an optimal receiving wide beam of the high-frequency base station, between narrow beams in the optimal receiving wide beam of the user equipment, and send the non-contention-based sequence, where at least one special subframe is preset in the radio frame, and at least one ULBP is reserved in the special subframe to send a preamble sequence.

In this case, the beam training unit sends the non-contention-based sequence in the ULBP reserved in the set special subframe. This achieves appropriate use of resources and reduces system overheads.

According to a third aspect, an uplink access method is provided, including:

in a process in which user equipment performs initial random access to a high-frequency base station, receiving, by the user equipment, a first random access response message sent by the high-frequency base station, where the first random access response message includes a non-contention-based sequence allocated by the high-frequency base station to the user equipment;

after the user equipment completes the initial random access to the high-frequency base station and in a beam training process, sending, by the user equipment, the non-contention-based sequence to the high-frequency base station; and receiving, by the user equipment, a second random access response message sent by the high-frequency base station, where the second random access response message is sent to the user equipment when the high-frequency base station detects the non-contention-based sequence, the second random access response message includes information about an optimal receiving wide beam of the high-frequency base station and an optimal sending narrow beam of the user equipment, and the optimal receiving wide beam of the high-frequency base station and the optimal sending narrow beam of the user equipment are determined by the high-frequency base station by detecting, on each receiving wide beam, the non-contention-based sequence sent by the user equipment.

With reference to the third aspect, in a first implementation of the third aspect, the sending, by the user equipment, the non-contention-based sequence to the high-frequency base station includes:

determining, by the user equipment, an optimal receiving wide beam of the user equipment; and separately sending, by the user equipment, the non-contention-based sequence to the high-frequency base station by using narrow beams in the optimal receiving wide beam of the user equipment.

With reference to the first implementation of the third aspect, in a second implementation of the third aspect, the determining, by the user equipment, an optimal receiving wide beam of the user equipment includes:

switching, by the user equipment, between receiving beams, and performing synchronization signal detection to determine an optimal sending wide beam of the high-frequency base station and the optimal receiving wide beam of the user equipment, where the synchronization signal is sent by the high-frequency base station; and the separately sending the non-contention-based sequence to the high-frequency base station by using narrow beams in the optimal receiving wide beam of the user equipment includes:

sequentially switching, by the user equipment in time slices corresponding to different receiving wide beams of the high-frequency base station, between the narrow beams in the optimal receiving wide beam of the user equipment, and sending the non-contention-based sequence, so that the high-frequency base station determines the optimal receiving wide beam of the high-frequency base station and the optimal sending narrow beam of the user equipment, where a receiving wide beam of the high-frequency base station is in a one-to-one correspondence with a time slice.

With reference to the second implementation of the third aspect, in a third implementation of the third aspect, the sequentially switching, by the user equipment in time slices corresponding to different receiving wide beams of the high-frequency base station, between narrow beams in the optimal receiving wide beam of the user equipment, and sending the non-contention-based sequence includes:

sequentially switching, by the user equipment in a ULBP of a special subframe of a radio frame and in time slices corresponding to different receiving wide beams of the high-frequency base station, between the narrow beams in the optimal receiving wide beam of the user equipment, and sending the non-contention-based sequence, where at least one special subframe is preset in the radio frame, and at least one ULBP is reserved in the special subframe to send a preamble sequence.

According to a fourth aspect, an uplink access method is provided, including:

in a process in which user equipment performs initial random access to a high-frequency base station, allocating, by the high-frequency base station, a non-contention-based sequence to the user equipment, and sending the non-contention-based sequence to the user equipment by using a first random access response message;

after the user equipment completes the initial random access to the high-frequency base station and in a beam training process, determining, by the high-frequency base station, an optimal receiving wide beam of the high-frequency base station and an optimal sending narrow beam of the user equipment by detecting, on each receiving wide beam of the high-frequency base station, the non-contention-based sequence sent by the user equipment; and sending, by the high-frequency base station, a second random access response message to the user equipment, where the second random access response message includes information about the optimal receiving wide beam of the high-frequency base station and the optimal sending narrow beam of the user equipment.

With reference to the fourth aspect, in a first possible implementation of the fourth aspect, the determining, by the high-frequency base station, an optimal receiving wide beam of the high-frequency base station and an optimal sending narrow beam of the user equipment by detecting, on each receiving wide beam of the high-frequency base station, the non-contention-based sequence sent by the user equipment includes:

detecting, by the high-frequency base station on each receiving wide beam of the high-frequency base station, the non-contention-based sequence sent by the user equipment;

determining, by the high-frequency base station, that a receiving wide beam of the high-frequency base station that is corresponding to the non-contention-based sequence with a highest received signal strength is the optimal receiving wide beam of the high-frequency base station; and determining, by the high-frequency base station, that a sending narrow beam corresponding to the optimal receiving wide beam of the high-frequency base station is the optimal sending narrow beam of the user equipment.

With reference to the first possible implementation of the fourth aspect, in a second possible implementation of the fourth aspect, the detecting, by the high-frequency base station on each receiving wide beam of the high-frequency base station, the non-contention-based sequence sent by the user equipment includes:

detecting, by the high-frequency base station in an uplink random access/beam-training period ULBP of a special subframe of a radio frame and on each receiving wide beam of the high-frequency base station, the non-contention-based sequence sent by the user equipment, where at least one special subframe is preset in the radio frame, and at least one ULBP is reserved in the special subframe to receive a preamble sequence.

With reference to the first possible implementation of the fourth aspect or the second possible implementation of the fourth aspect, in a third possible implementation of the fourth aspect, in the beam training process and before the detecting, by the high-frequency base station, the non-contention-based sequence sent by the user equipment, the method includes:

sending, by the high-frequency base station, a synchronization signal to the user equipment by using different wide beams, so that the user equipment determines an optimal receiving wide beam of the user equipment, sequentially switches, in time slices corresponding to different receiving wide beams of the high-frequency base station, between narrow beams in the optimal receiving wide beam of the user equipment, and sends the non-contention-based sequence, where a receiving wide beam of the high-frequency base station is in a one-to-one correspondence with a time slice; and the determining, by the high-frequency base station, that a sending narrow beam corresponding to the optimal receiving wide beam of the high-frequency base station is the optimal sending narrow beam of the user equipment includes:

determining, by the high-frequency base station, a target time slice corresponding to the optimal receiving wide beam of the high-frequency base station, and determining that a sending narrow beam used for sending the non-contention-based sequence in the target time slice is the optimal sending narrow beam of the user equipment.

According to a fifth aspect, user equipment is provided, including a receiver, a transmitter, and a processor, where:

the receiver is configured to: in a process in which user equipment performs initial random access to a high-frequency base station, receive a first random access response message sent by the high-frequency base station, where the first random access response message includes a non-contention-based sequence allocated by the high-frequency base station to the user equipment;

the transmitter is configured to: after the user equipment completes the initial random access to the high-frequency base station and in a beam training process, send the non-contention-based sequence to the high-frequency base station; and the receiver is further configured to: receive a second random access response message sent by the high-frequency base station, where the second random access response message is sent to the user equipment when the high-frequency base station detects the non-contention-based sequence, the second random access response message includes information about an optimal receiving wide beam of the high-frequency base station and an optimal sending narrow beam of the user equipment, and the optimal receiving wide beam of the high-frequency base station and the optimal sending narrow beam of the user equipment are determined by the high-frequency base station by detecting, on each receiving wide beam, the non-contention-based sequence sent by the user equipment.

It can be learned from the foregoing technical solutions that this application has the following advantages:

In this application, in the process in which the user equipment performs initial random access to the high-frequency base station, the high-frequency base station allocates the non-contention-based sequence to the user equipment. After the user equipment completes the initial random access to the high-frequency base station and in the beam training process, the high-frequency base station determines the optimal receiving wide beam of the high-frequency base station and the optimal sending narrow beam of the user equipment by detecting the non-contention-based sequence sent by the user equipment, and notifies the user equipment of the optimal receiving wide beam of the high-frequency base station and the optimal sending narrow beam of the user equipment. Therefore, initial random access and subsequent beam training of the user equipment can be implemented on a random access resource of a high-frequency communications system. This controls system overheads and ensures precision of beam training, thereby improving performance of the high-frequency communications system.

DESCRIPTION OF EMBODIMENTS

Figure 1:
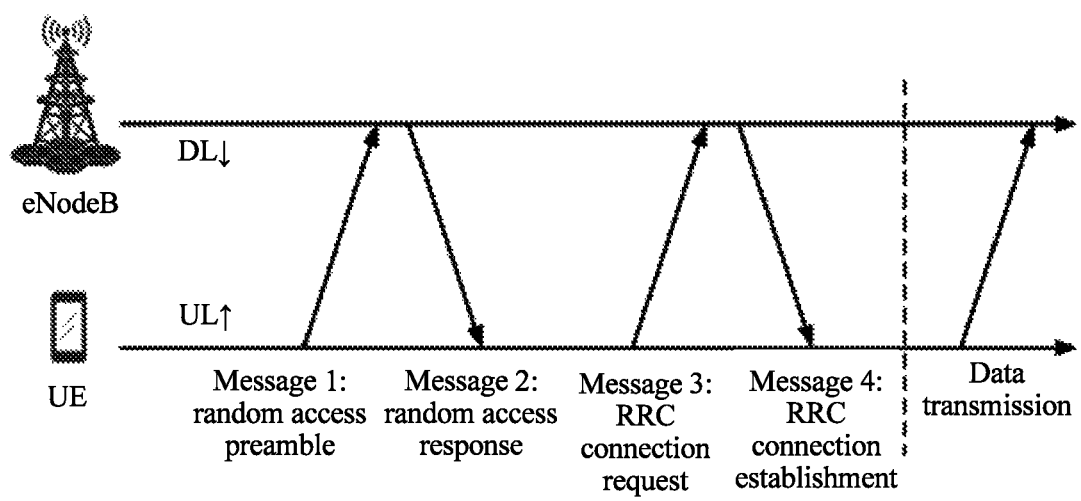
FIG. 1 is a schematic diagram of an initial random access process of user equipment according to this application.

This application provides an uplink access method, user equipment, and a base station, so as to control system overheads, ensure precision of beam training, and therefore improve performance of a high-frequency communications system.

To make persons skilled in the art understand the solutions in the present invention better, the following clearly describes the technical solutions in this application with reference to the accompanying drawings in this application. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

In the specification, claims, and accompanying drawings of the present invention, the terms "first", "second", and so on (if they exist) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those units, but may include other units not expressly listed or inherent to such a process, method, system, product, or device.

The following first briefly describes some concepts used in this application.

Radio resource control (Radio Resource Control, RRC for short) RRC processes third layer information of a control plane between user equipment (User Equipment, UE for short) and a base station, such as processes of paging (Paging), RRC connection establishment (RRC connection establishment), and RRC connection release (RRC connection release).

In an LTE high-frequency communications system, to establish a normal communications link with a high-frequency base station, the user equipment first needs to obtain high-frequency downlink synchronization by using a downlink synchronization channel, and initiates an initial random access process by using a random access channel to obtain uplink synchronization. Initial beam alignment between the high-frequency base station and the user equipment can be implemented by using a downlink synchronization process and an initial uplink random access process. After completing the initial access to a system, the user equipment needs to perform periodic or aperiodic beam tracking, so as to ensure normal data communication.

In the LTE system, two states are defined for the UE: one is an RRC_IDLE mode, an idle state for short, that is, a point-to-point connection with a base station is not established; and the other is RRC_CONNECTED, a connected state for short, that is, the point-to-point connection with the base station is established.

In addition, in the LTE system, two different random access processes are defined. A first one is a contention-based random access process, and a second one is a non-contention based random access process. A risk of conflict exists in the contention-based random access. A plurality of user equipments may transmit a same preamble sequence at a same time, this leads to an increased time of an entire access process, and precision and accuracy of the beam tracking cannot be ensured. Therefore, the contention-based random access is applicable to an event having a relatively loose requirement for time limit. Non-contention based random access has fewer steps and needs less time, and is applicable to an event having a requirement for time limit.

Types of events that trigger a random access process and that are defined in the LTE system are mainly as follows:

1) Initial access: After being powered on or is in an RRC_IDLE mode, user equipment starts to initiate initial access to access a network.

2) Link re-establishment: When the user equipment is in an RRC_CONNECTED mode, because a radio environment changes, the user equipment encounters a radio link failure (Radio Link Failure), and the user equipment re-establishes a link, with an attempt to restore the RRC_CONNECTED mode.

3) Switching: When the user equipment is in the RRC_CONNECTED mode, the user equipment needs to switch from one cell to another cell in a moving process.

4) Arrival of downlink data: When the user equipment is in the RRC_CONNECTED mode, an uplink synchronization state is "out-of-synchronization". When downlink data arrives, a base station instructs, by using a PDCCH, the user equipment to quickly restore uplink synchronization.

5) Arrival of uplink data: When the user equipment is in the RRC_CONNECTED mode, the uplink synchronization state is "out-of-synchronization" or that no physical uplink control channel (Physical Uplink Control Channel, PUCCH for short) resource is available for a scheduling request (Scheduling Request, SR for short). When uplink data arrives, the user equipment initiates a random access process and performs uplink synchronization.

6) Positioning: When the user equipment is in the RRC_CONNECTED mode, the user equipment needs to be positioned. The user equipment obtains timing advance (Timing Advance, TA for short) information by using a random access process.

In the foregoing process of triggering the random access process, the initial access, the link re-establishment, and the arrival of the uplink data are mainly applied to a contention-based random access process, and the switching, the arrival of the downlink data, and the positioning are mainly applied to a non-contention based random access process.

As shown in FIG. 1, an initial random access process of UE is mainly as follows:

The UE sends a random access preamble to a base station→The base station sends a random access response message to the UE after detecting the random access preamble sent by the UE→The UE sends an RRC connection request to the base station after receiving the random access response message sent by the base station→The UE receives the RRC connection request and establishes a connection.

Periodic beam training process: After successfully completing the initial random access to the high-frequency communications system (a high-frequency base station), the user equipment needs to periodically perform a beam training process, so as to maintain accuracy of beam selection.

The following describes an embodiment of an uplink access method in this application.

On a high-frequency base station side, the uplink access method provided in this application includes:

allocating, by a high-frequency base station, a non-contention-based sequence to user equipment, and sending the non-contention-based sequence to the user equipment by using a first random access response message;

determining, by the high-frequency base station, an optimal receiving wide beam of the high-frequency base station and an optimal sending narrow beam of the user equipment by detecting, on each receiving wide beam of the high-frequency base station, the non-contention-based sequence sent by the user equipment; and sending, by the high-frequency base station, a second random access response message to the user equipment, where the second random access response message includes information about the optimal receiving wide beam of the high-frequency base station and the optimal sending narrow beam of the user equipment.

On a user equipment side, the uplink access method provided in this application includes:

receiving, by the user equipment, a first random access response message sent by the high-frequency base station, where the first random access response message includes a non-contention-based sequence allocated by the high-frequency base station to the user equipment;

sending, by the user equipment, the non-contention-based sequence to the high-frequency base station; and receiving, by the user equipment, a second random access response message sent by the high-frequency base station, where the second random access response message is sent to the user equipment when the high-frequency base station detects the non-contention-based sequence, the second random access response message includes information about an optimal receiving wide beam of the high-frequency base station and an optimal sending narrow beam of the user equipment, and the optimal receiving wide beam of the high-frequency base station and the optimal sending narrow beam of the user equipment are determined by the high-frequency base station by detecting, on each receiving wide beam, the non-contention-based sequence sent by the user equipment.

Figure 2:
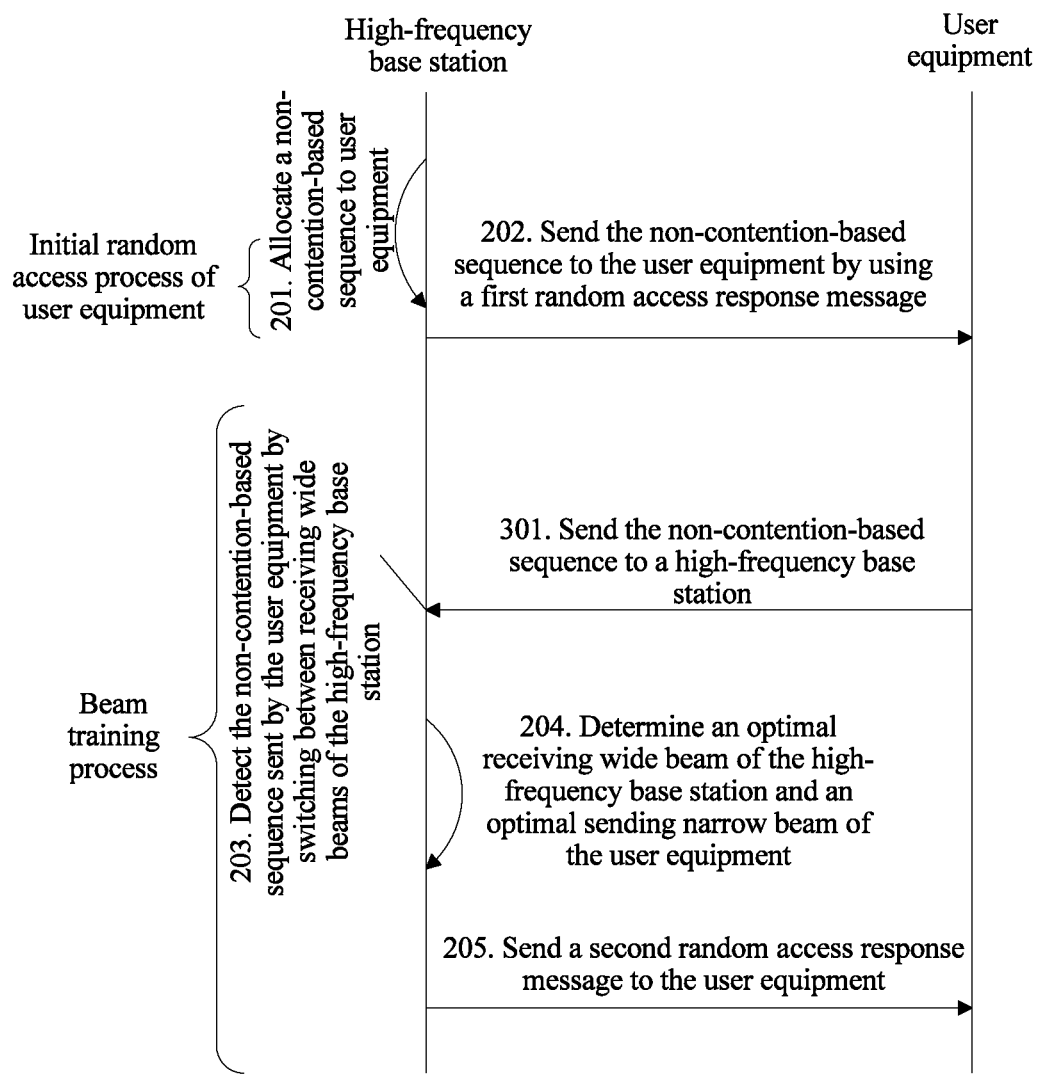
FIG. 2 is a schematic diagram of an embodiment of an uplink access method according to this application.

Referring to FIG. 2, an embodiment of the uplink access method in this application includes the following steps.

201. In a process in which user equipment performs initial random access to a high-frequency base station, the high-frequency base station allocates a non-contention-based sequence to the user equipment.

The non-contention-based sequence may be used in a non-contention based random access process. In this application, the non-contention-based sequence may be a sequence that is used by the user equipment to perform subsequent beam training.

202. Send the non-contention-based sequence to the user equipment by using a first random access response message.

The first random access response message is a random access response message that is sent by the high-frequency base station to the user equipment in the process in which the user equipment performs initial random access to the high-frequency base station.

Figure 3:
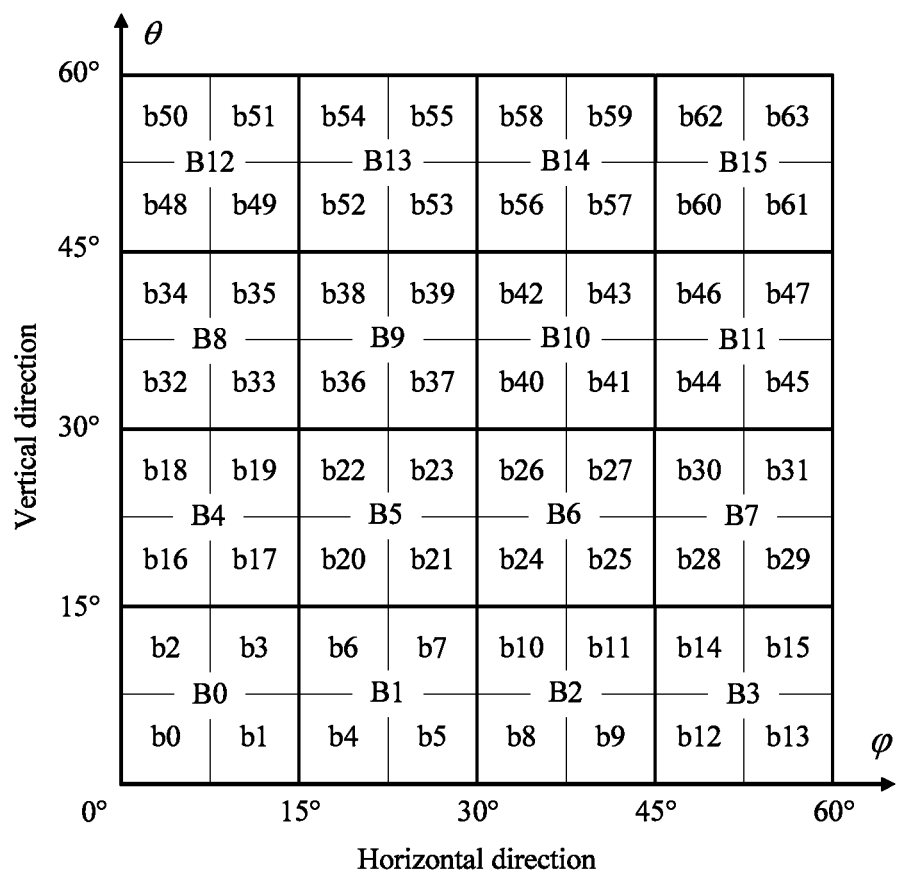
FIG. 3 is a schematic diagram of an embodiment of wide and narrow beams in a high-frequency communications system according to this application.

In this embodiment, a quantity of wide/narrow beams in a high-frequency communications system is set according to a requirement. For example, as shown in FIG. 3, it is assumed that a high-frequency cell (a cell corresponding to the high-frequency base station) needs to cover an area with a horizontal direction of 60° and a pitching direction of 60°. It is assumed that an antenna array can generate a narrow beam with a beam width of 7.5° and a wide beam with a beam width of 15°. The high-frequency cell may be fully covered by 64 narrow beams (b0-b63 shown in FIG. 3), or may be fully covered by 16 wide beams (B0-B15 shown in the figure). One wide beam can cover an area covered by four narrow beams. As shown in FIG. 3, a wide beam B0 can cover an area covered by narrow beams b0-b3.

The wide beam is used to transmit a synchronization signal, a broadcast signal, and the like to reduce system overheads. The narrow beam is used to transmit a random access signal and user data information to obtain a high system capacity.

Figure 4:
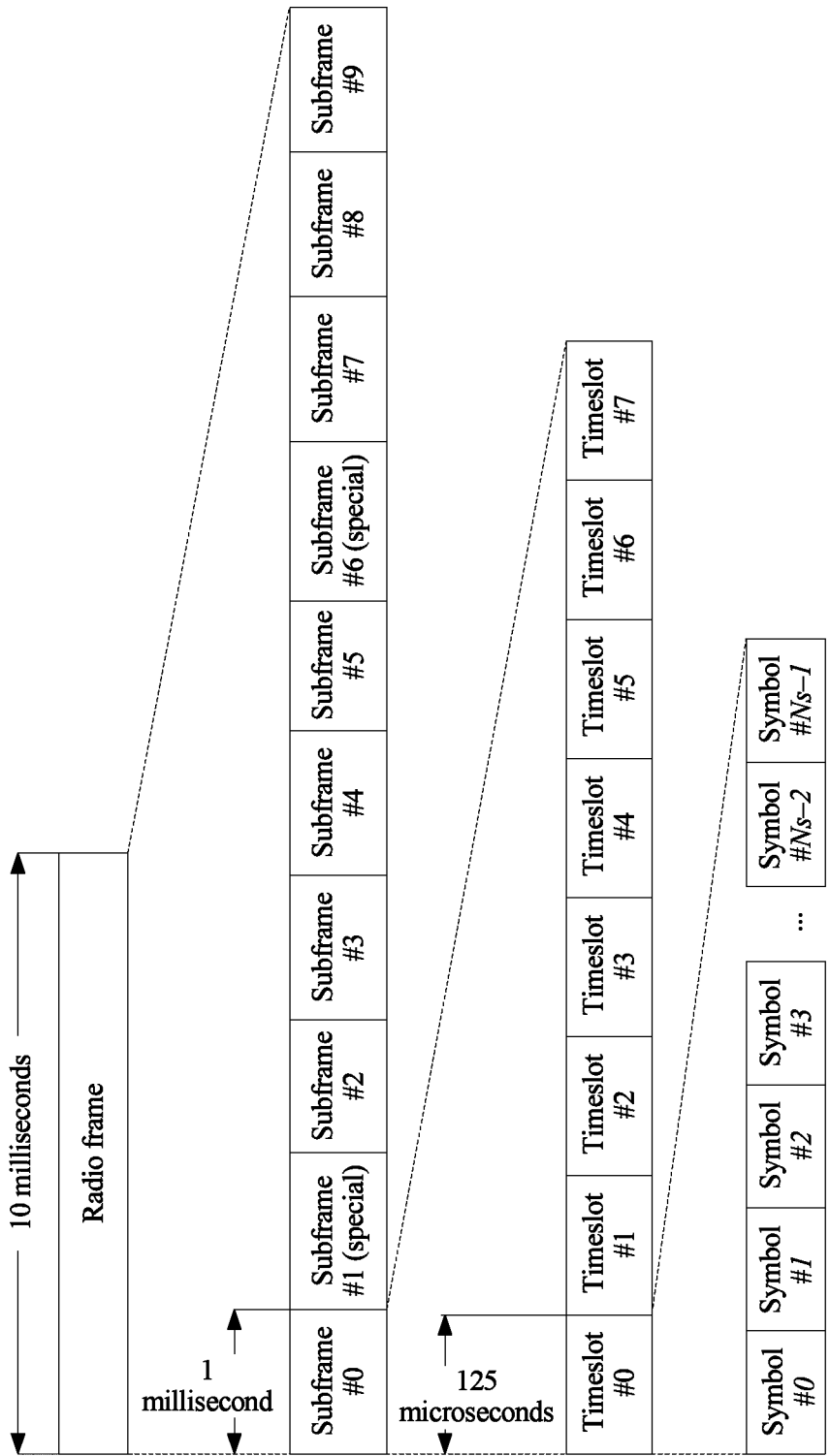
FIG. 4 is a schematic diagram of a general frame structure of a high-frequency communications system according to this application.

In this application, an uplink random access/beam-training period (Uplink random access & Beam-training Period, ULBP) and a downlink synchronization/beam-training period (Downlink synchronization & Beam-training Period, DLBP for short) may be pre-defined in the high-frequency communications system. FIG. 4 shows a general frame structure in the high-frequency communications system. Compatibility with a frame structure in an LTE system is considered when the general frame structure is designed. 10 milliseconds are used as a frame length of a radio frame, one radio frame includes 10 radio subframes, and a length of each radio subframe is 1 millisecond. Two types of radio subframes are defined for the radio frame: a common subframe and a special subframe. The common subframe is mainly used for normal data transmission and is divided into eight timeslots with a length of 125 microseconds. Each timeslot includes Ns OFDM symbols, and a value of Ns depends on a frequency band used by the high-frequency communications system. For 72 GHz, 28 GHz, and 14 GHz systems, typical values of Ns may be respectively 80, 40, and 20.

Figure 5:
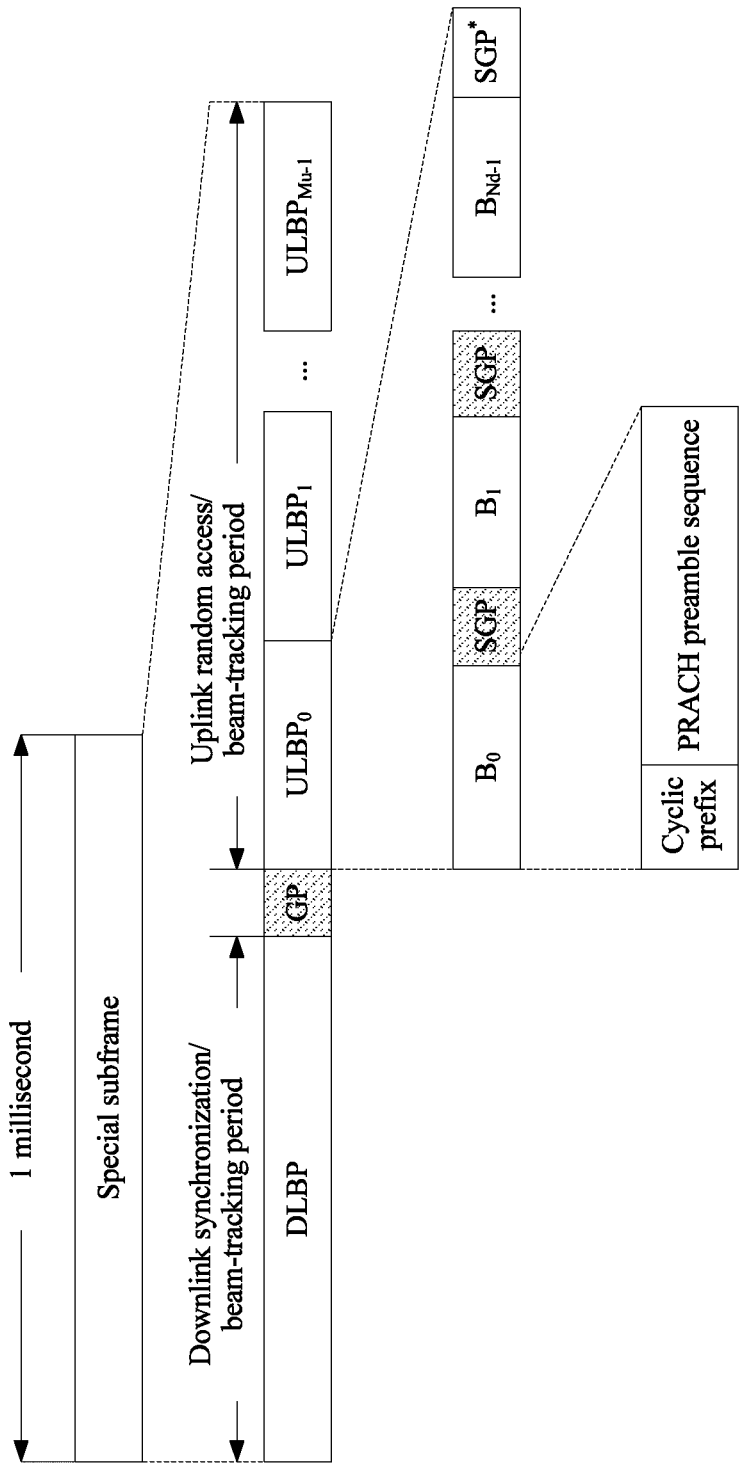
FIG. 5 is a schematic diagram of a special subframe structure according to this application.

The special subframe is mainly used for downlink synchronization, uplink random access, and beam training, and includes the downlink synchronization/beam-training period, an uplink/downlink switching guard period, and the uplink random access/beam-training period, as shown in FIG. 5. The uplink random access/beam-training period may be further divided into Mu ULBP sub-periods. A base station traverses all Nd receiving beams in a ULBP sub-period, and sequentially receives, by using different receiving beams, a random access signal sent by the user equipment. The user equipment sends, by using a fixed sending beam, the random access signal to the base station in one or more beam receiving periods of the base station in one ULBP sub-period. In different ULBP sub-periods, the user equipment can switch between different sending beams to send the random access signal to the base station. In a special subframe, the user equipment can switch between a maximum of Mu sending beams. A typical value of Mu is 4.

Figure 6:
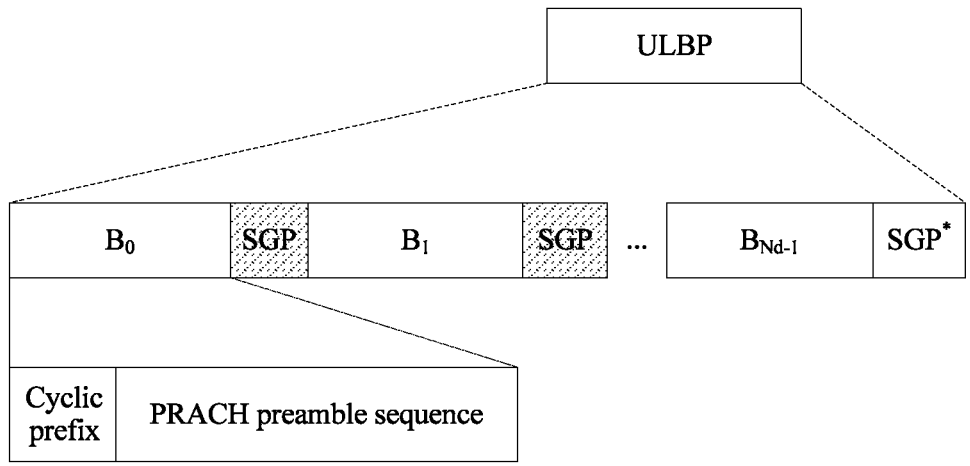
FIG. 6 is a schematic diagram of a ULBP sub-period according to this application.

As shown in FIG. 6, the ULBP sub-period is described in further detail as follows: $B_0$-$B_{Nd-1}$ are Nd beam receiving periods of the high-frequency base station. A corresponding receiving beam is used to receive a signal in one beam receiving period of the high-frequency base station. For example, if a beam receiving period of the high-frequency base station is marked as $B_0$, the high-frequency base station uses a receiving beam with a sequence number of 0 to receive a signal. If a beam receiving period of the high-frequency base station is marked as $B_{Nd-1}$, the high-frequency base station uses a receiving beam with a sequence number of Nd−1 to receive a signal. The user equipment sends the random access signal in one or more beam receiving periods of the high-frequency base station in the ULBP. In FIG. 6, it is assumed that a PRACH symbol including a cyclic prefix and a physical random access channel (Physical Random Access Channel, PRACH for short) preamble sequence is sent in a beam receiving period of the high-frequency base station. A length of the PRACH symbol depends on a frequency band used by the high-frequency communications system, a bandwidth occupied by the ULBP, and a subcarrier spacing of the ULBP. For a 72 GHz, 28 GHz, and 14 GHz systems, typical length values of the PRACH symbol are respectively 9.375 microseconds, 9.375 microseconds, and 12.5 microseconds. When a plurality of PRACH symbols are sent in a beam receiving period of the high-frequency base station, a length of the beam receiving period of the high-frequency base station and a length of the PRACH symbol need to be calculated according to a bandwidth actually occupied by the ULBP, a subcarrier spacing, and a frequency band.

One beam switching guard period (Switching Guard Period, SGP) is reserved between two beam receiving periods of the high-frequency base station for switching between receiving beams of the base station. One special beam switching guard period (SGP*) is reserved after a last base station beam receiving period in the ULBP for switching between sending beams of the user equipment.

Figure 7:
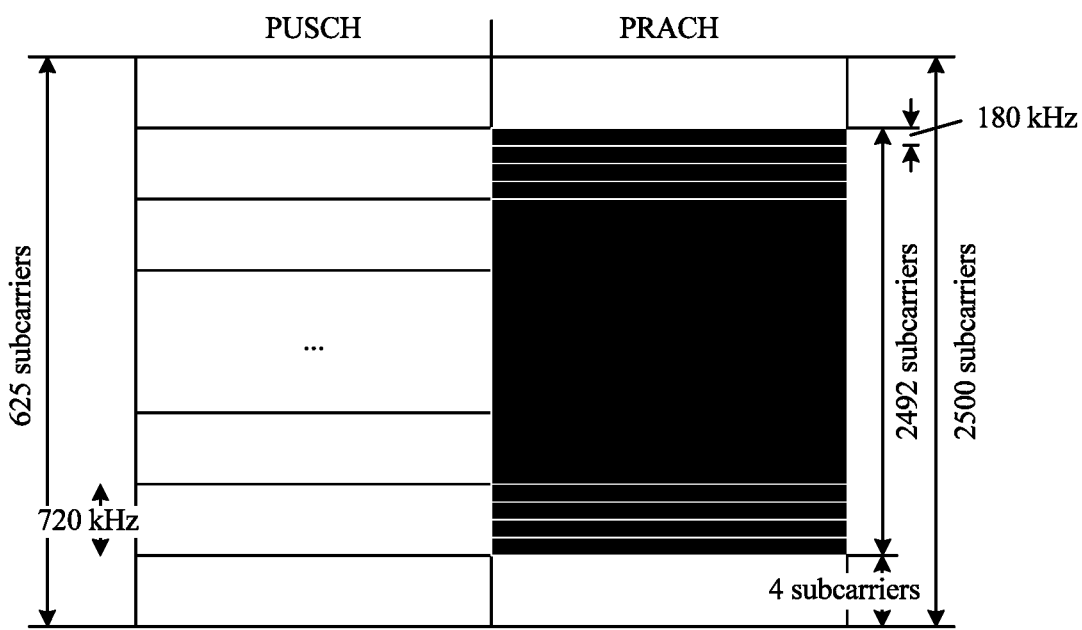
FIG. 7 is a diagram of an example ULBP resource in a 72 GHz system according to this application.

FIG. 7 shows an example ULBP resource in a 72 GHz system. The ULBP uses a subcarrier bandwidth of 180 kHz and an intermediate bandwidth of 450 MHz. A total of 2492 subcarriers may be used to transmit the random access signal.

In this application, the allocating, by a high-frequency base station, a non-contention-based sequence to user equipment, and sending the non-contention-based sequence to the user equipment by using a first random access response message may specifically include:

using, by the high-frequency base station, reciprocity (reciprocity) between a receiving beam and a sending beam, and sending the synchronization signal to the user equipment by using different wide beams, so that the user equipment determines an optimal sending wide beam of the high-frequency base station and an optimal receiving wide beam of the user equipment; sequentially switches, in time slices corresponding to different receiving wide beams of the high-frequency base station, between narrow beams in the optimal receiving wide beam of the user equipment, and sends a random preamble sequence, where a receiving wide beam of the high-frequency base station is in a one-to-one correspondence with a time slice, and the time slice is a receiving time duration of the receiving wide beam;

determining, by the high-frequency base station, an optimal receiving wide beam of the high-frequency base station and an optimal sending narrow beam of the user equipment by detecting, on each receiving wide beam of the high-frequency base station, the random preamble sequence sent by the user equipment; and allocating the non-contention-based sequence to the user equipment; and sending, by the high-frequency base station, the first random access response message to the user equipment by using the optimal receiving wide beam of the high-frequency base station, where the first random access response message includes the optimal receiving wide beam of the high-frequency base station, the optimal sending narrow beam of the user equipment, and the non-contention-based sequence.

The determining, by the high-frequency base station, an optimal receiving wide beam of the high-frequency base station and an optimal sending narrow beam of the user equipment by detecting, on each receiving wide beam of the high-frequency base station, the random preamble sequence sent by the user equipment may include:

detecting, by the high-frequency base station on each receiving wide beam of the high-frequency base station, the random preamble sequence sent by the user equipment;

determining, by the high-frequency base station, that a receiving wide beam of the high-frequency base station that is corresponding to the random preamble sequence with a highest received signal strength is the optimal receiving wide beam of the high-frequency base station; and determining, by the high-frequency base station, that a sending narrow beam corresponding to the optimal receiving wide beam of the high-frequency base station is the optimal sending narrow beam of the user equipment.

For example, the high-frequency base station may detect a random preamble sequence on each receiving wide beam, and compares signal strength of the random preamble sequence that is sent by the user equipment and that is received by different receiving wide beams. The high-frequency base station determines that a receiving wide beam of the high-frequency base station that is corresponding to the random preamble sequence with a highest received signal strength is the optimal receiving wide beam of the high-frequency base station. The high-frequency base station determines that the sending narrow beam corresponding to the optimal receiving wide beam of the high-frequency base station is the optimal sending narrow beam of the user equipment.

Optionally, the detecting, by the high-frequency base station on each receiving wide beam of the high-frequency base station, the random preamble sequence sent by the user equipment may include:

detecting, by the high-frequency base station in an uplink random access/beam-training period ULBP of a special subframe of a radio frame and on each receiving wide beam of the high-frequency base station, the random preamble sequence sent by the user equipment, where at least one special subframe is preset in the radio frame, at least one ULBP is reserved in the special subframe to receive a preamble sequence, and the preamble sequence may include a random preamble sequence and a non-contention-based sequence.

Corresponding to the high-frequency base station, in an initial access process of the user equipment, the user equipment may perform the following corresponding steps:

the user equipment switches between receiving beams and performs synchronization signal detection to determine the optimal sending wide beam of the high-frequency base station and the optimal receiving wide beam of the user equipment;

the user equipment sequentially switches, in time slices corresponding to different receiving wide beams of the high-frequency base station, between narrow beams in the optimal receiving wide beam of the user equipment, and sends the random preamble sequence, so that the high-frequency base station determines the optimal receiving wide beam of the high-frequency base station and the optimal sending narrow beam of the user equipment, where a receiving wide beam of the high-frequency base station is in a one-to-one correspondence with a time slice; herein, because of the reciprocity between the receiving beam and the sending beam, it may be determined that in this case, the optimal receiving wide beam of the user equipment is an optimal sending wide beam of the user equipment; and therefore, the user equipment may sequentially switch, in a time slice corresponding to the optimal receiving wide beam of the base station in the ULBP, between the narrow beams in the optimal receiving wide beam of the user equipment, and sends the random preamble sequence; and the user equipment receives the first random access response message sent by the high-frequency base station, where the first random access response message includes information about the optimal receiving wide beam that is of the high-frequency base station and that is determined by the high-frequency base station and the optimal sending narrow beam of the user equipment, and the non-contention-based sequence allocated by the high-frequency base station to the user equipment.

Figure 8:
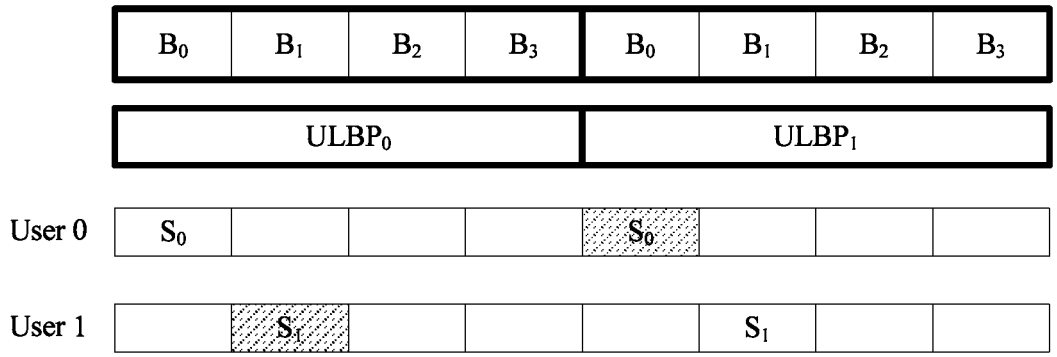
FIG. 8 is a schematic diagram of user equipment synchronization signal detection according to this application.

As shown in FIG. 8, it is assumed that user equipment 0 detects, by means of synchronization signal detection, that the optimal sending/receiving wide beam of the high-frequency base station is $B_0$. The user equipment sends, in a time slice corresponding to $B_0$ in a $ULBP_0$, a preamble sequence $S_0$ to the base station by using a narrow beam 0; and the user equipment sends, in a time slice corresponding to $B_0$ in a $ULBP_1$, the preamble sequence $S_0$ to the base station by using a narrow beam 1. Similarly, it is assumed that user equipment 1 detects that the optimal sending/receiving wide beam of the high-frequency base station is $B_1$. The user equipment sends, in a time slice corresponding to $B_1$ in the $ULBP_0$, a preamble sequence $S_1$ to the base station by using the narrow beam 0; and the user equipment sends, in a time slice corresponding to $B_1$ in the $ULBP_1$, the preamble sequence $S_1$ to the base station by using the narrow beam 1.

In the process in which the user equipment performs initial random access to the high-frequency base station, when the high-frequency base station sends the non-contention-based sequence to the user equipment by using the first random access response message, the user equipment receives the first random access response message sent by the high-frequency base station.

The first random access response message includes the non-contention-based sequence allocated by the high-frequency base station to the user equipment, and the optimal receiving wide beam of the high-frequency base station and the optimal sending narrow beam of the user equipment that are determined by the high-frequency base station in the initial random access process of the user equipment.

301. After the user equipment completes the initial random access to the high-frequency base station and in a beam training process, the user equipment sends the non-contention-based sequence to the high-frequency base station.

Optionally, that the user equipment sends the non-contention-based sequence to the high-frequency base station includes:

determining, by the user equipment, an optimal receiving wide beam of the user equipment; and separately sending, by the user equipment, the non-contention-based sequence to the high-frequency base station by using narrow beams in the optimal receiving wide beam of the user equipment.

Optionally, the user equipment switches between receiving beams and performs synchronization signal detection to determine an optimal sending wide beam of the high-frequency base station and the optimal receiving wide beam of the user equipment, where the synchronization signal is sent by the high-frequency base station.

The separately sending the non-contention-based sequence to the high-frequency base station by using narrow beams in the optimal receiving wide beam of the user equipment includes:

sequentially switching, by the user equipment in time slices corresponding to different receiving wide beams of the high-frequency base station, between the narrow beams in the optimal receiving wide beam of the user equipment, and sending the non-contention-based sequence, so that the high-frequency base station determines the optimal receiving wide beam of the high-frequency base station and the optimal sending narrow beam of the user equipment, where a receiving wide beam of the high-frequency base station is in a one-to-one correspondence with a time slice.

A manner in which the user equipment determines the optimal receiving wide beam of the user equipment may be the same as a manner of determining the optimal receiving wide beam of the high-frequency base station and the optimal sending wide beam of the user equipment in an initial access process of the user equipment. For example, the user equipment switches between receiving beams and performs synchronization signal detection to determine the optimal receiving wide beam of the user equipment. Details are not described herein again.

Optionally, the sequentially switching, by the user equipment in time slices corresponding to different receiving wide beams of the high-frequency base station, between narrow beams in the optimal receiving wide beam of the user equipment, and sending the non-contention-based sequence includes:

sequentially switching, by the user equipment in a ULBP of a special subframe of a radio frame and in time slices corresponding to different receiving wide beams of the high-frequency base station, between the narrow beams in the optimal receiving wide beam of the user equipment, and sending the non-contention-based sequence, where at least one special subframe is preset in the radio frame, and at least one ULBP is reserved in the special subframe to send a preamble sequence.

203. After the user equipment completes the initial random access to the high-frequency base station and in a beam training process, the high-frequency base station detects, on each receiving wide beam of the high-frequency base station, the non-contention-based sequence sent by the user equipment.

204. The high-frequency base station determines an optimal receiving wide beam of the high-frequency base station and an optimal sending narrow beam of the user equipment.

Optionally, the determining, by the high-frequency base station, an optimal receiving wide beam of the high-frequency base station and an optimal sending narrow beam of the user equipment by detecting, on each receiving wide beam of the high-frequency base station, the non-contention-based sequence sent by the user equipment includes:

detecting, by the high-frequency base station on each receiving wide beam of the high-frequency base station, the non-contention-based sequence sent by the user equipment;

determining, by the high-frequency base station, that a receiving wide beam of the high-frequency base station that is corresponding to the non-contention-based sequence with a highest received signal strength is the optimal receiving wide beam of the high-frequency base station; and determining, by the high-frequency base station, that a sending narrow beam corresponding to the optimal receiving wide beam of the high-frequency base station is the optimal sending narrow beam of the user equipment.

Further and optionally, the detecting, by the high-frequency base station on each receiving wide beam of the high-frequency base station, the non-contention-based sequence sent by the user equipment includes:

detecting, by the high-frequency base station in an uplink random access/beam-training period ULBP of a special subframe of a radio frame and on each receiving wide beam of the high-frequency base station, the non-contention-based sequence sent by the user equipment, where at least one special subframe is preset in the radio frame, and at least one ULBP is reserved in the special subframe to receive a preamble sequence.

Further and optionally, in the beam training process and before the high-frequency base station detects the non-contention-based sequence sent by the user equipment, the method includes:

sending, by the high-frequency base station, a synchronization signal to the user equipment by using different wide beams, so that the user equipment determines an optimal receiving wide beam of the user equipment, sequentially switches, in time slices corresponding to different receiving wide beams of the high-frequency base station, between narrow beams in the optimal receiving wide beam of the user equipment, and sends the non-contention-based sequence, where a receiving wide beam of the high-frequency base station is in a one-to-one correspondence with a time slice.

The determining, by the high-frequency base station, that a sending narrow beam corresponding to the optimal receiving wide beam of the high-frequency base station is the optimal sending narrow beam of the user equipment includes:

determining, by the high-frequency base station, a target time slice corresponding to the optimal receiving wide beam of the high-frequency base station, and determining that a sending narrow beam used for sending the non-contention-based sequence in the target time slice is the optimal sending narrow beam of the user equipment.

A process in which the high-frequency base station determines the optimal receiving wide beam of the high-frequency base station and the optimal sending narrow beam of the user equipment is similar to the initial random access process of the user equipment. For example, by detecting the non-contention-based sequence on each receiving wide beam of the high-frequency base station and comparing signal strength of the non-contention-based sequence that is sent by the user equipment and that is received by different receiving wide beams, the high-frequency base station determines that a narrow beam in the optimal receiving wide beam of the user equipment that is corresponding to a non-contention-based sequence with a highest received signal strength is the optimal sending narrow beam of the user equipment, and the high-frequency base station determines that a receiving wide beam of the high-frequency base station that is corresponding to the non-contention-based sequence with a highest received signal strength is the optimal receiving wide beam of the high-frequency base station.

Specifically, as shown in FIG. 7, if the high-frequency base station determines that a non-contention-based sequence sent by the user equipment on a ULBP1 has a highest signal strength, a narrow beam 1 in the optimal sending wide beam of the user equipment that is corresponding to the non-contention-based sequence is the optimal sending narrow beam selected by the high-frequency base station. In this case, a receiving wide beam corresponding to the high-frequency base station is the optimal receiving wide beam of the high-frequency base station.

205. The high-frequency base station sends a second random access response message to the user equipment, where the second random access response message includes information about the optimal receiving wide beam of the high-frequency base station and the optimal sending narrow beam of the user equipment.

After determining the optimal receiving wide beam of the high-frequency base station and the optimal sending narrow beam of the user equipment by detecting the non-contention-based sequence, the high-frequency base station sends the second random access response message to the user equipment, to notify the user equipment of the optimal receiving wide beam of the high-frequency base station and the optimal sending narrow beam of the user equipment, thereby maintaining accuracy of beam selection, ensuring precision of beam training, and improving performance of the high-frequency communications system.

In this case, the user equipment receives the second random access response message sent by the high-frequency base station.

In this case, the user equipment may use the optimal receiving wide beam of the high-frequency base station and optimal sending narrow beam of the user equipment in the received second random access response message to communicate with the high-frequency base station.

In this application, in the process in which the user equipment performs initial random access to the high-frequency base station, the high-frequency base station allocates a non-contention-based sequence to the user equipment, determines the optimal receiving wide beam of the high-frequency base station and the optimal sending narrow beam of the user equipment, and sends the non-contention-based sequence to the user equipment by using the first random access response message. After the user equipment completes the initial random access to the high-frequency base station and in a periodical beam training process, the high-frequency base station switches between receiving wide beams and detects the non-contention-based sequence sent by the user equipment, to re-determine the optimal receiving wide beam of the high-frequency base station and the optimal sending narrow beam of the user equipment. The high-frequency base station sends a second random access response message including an optimal receiving wide beam of the high-frequency base station and an optimal sending narrow beam of the user equipment that are re-determined by the high-frequency base station to the user equipment. In this application, initial random access and subsequent beam training of the user equipment can be implemented on a random access resource of the high-frequency communications system. This controls system overheads and ensures precision of beam training, thereby improving performance of the high-frequency communications system.

Because high-low frequency hybrid networking is one of main network deployment scenarios of the high-frequency communications system, effectively using a low frequency to transmit corresponding information is an effective method for accelerating access to a high-frequency system. Therefore, in the foregoing embodiment, on a high-frequency base station side, before the process in which the user equipment performs initial random access to the high-frequency base station, if the user equipment has successfully accessed a low-frequency base station, the uplink access method may further include:

Before the process in which the user equipment performs initial random access to the high-frequency base station, the method further includes:

receiving, by the high-frequency base station, a unique access preamble sequence that is allocated to the user equipment and that is sent by the low-frequency base station, where when the high-frequency base station receives the access preamble sequence sent by the user equipment, it indicates that the user equipment successfully accesses the high-frequency base station.

On a user equipment side and before the process in which the user equipment performs initial random access to the high-frequency base station, if the user equipment has successfully accessed the low-frequency base station, before the process in which the user equipment performs initial random access to the high-frequency base station, the uplink access method further includes:

sending, by the user equipment, a random access request used to request access to the high-frequency base station to the low-frequency base station, where the random access request includes a cell identity used by the low-frequency base station to request access to the high-frequency base station; receiving, by the user equipment, a second random preamble sequence sent by the low-frequency base station, where the second random preamble sequence is allocated to the user equipment by using the cell identity of the high-frequency base station after the low-frequency base station receives the random access request; and accessing, by the user equipment, the high-frequency base station by using the second random preamble sequence.

In the high-low frequency hybrid networking, a process in which the user equipment accesses the high-frequency system is roughly as follows:

Step 1: It is assumed that the user equipment has successfully accessed the low-frequency base station. The user equipment sends the random access request to the low-frequency base station by using a low frequency, to request access to the high-frequency base station, where the random access request includes a cell ID number used to request access to the high-frequency base station, and the random access request may be transferred by using low-frequency RRC signaling.

Step 2: After receiving random access request information sent by user equipment, the low-frequency base station allocates a random access preamble sequence to the user equipment, and sends the random access preamble sequence to the user equipment by using low-frequency signaling. For user equipments requesting access to a same high-frequency base station, the low-frequency base station may allocate a unique access preamble sequence to each of the user equipments. The high-frequency base station can identify the unique user equipment by using the access preamble sequence.

The foregoing has described the embodiment of the uplink access method of interaction between the high-frequency base station and the user equipment according to this application. The following separately describes embodiments of the uplink access method on the high-frequency base station side and on the user equipment side according to this application.

Figure 9:
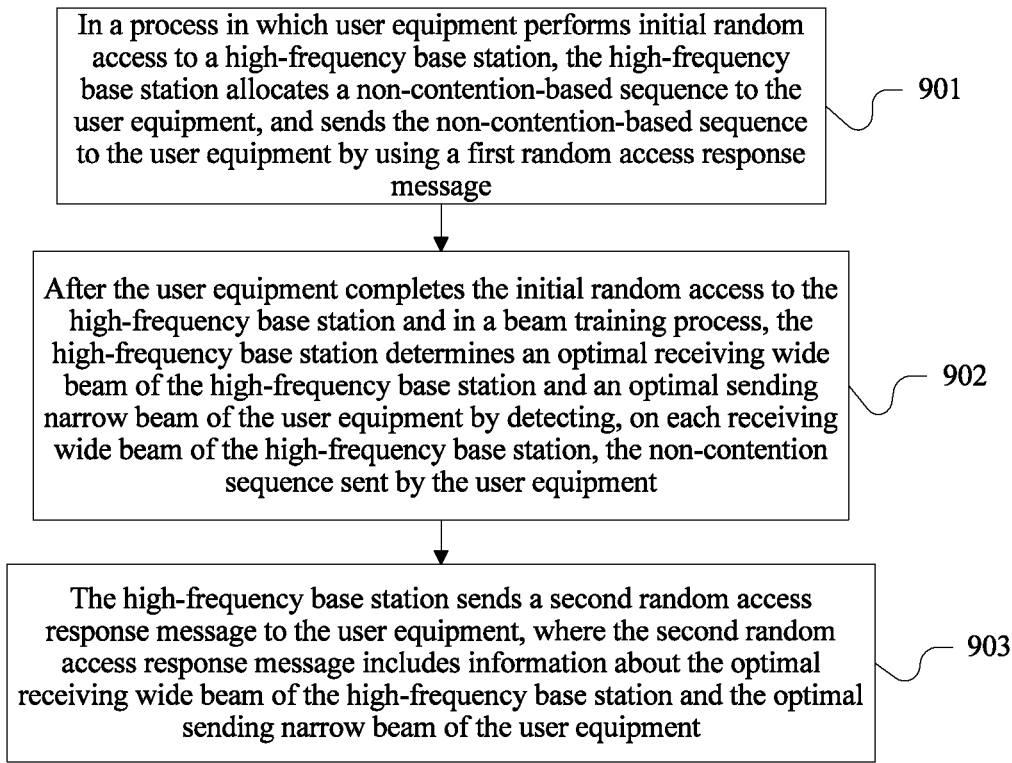
FIG. 9 is a schematic diagram of an embodiment of an uplink access method according to this application.

Referring to FIG. 9, an embodiment of the uplink access method in this application includes:

901. In a process in which user equipment performs initial random access to a high-frequency base station, the high-frequency base station allocates a non-contention-based sequence to the user equipment, and sends the non-contention-based sequence to the user equipment by using a first random access response message.

902. After the user equipment completes the initial random access to the high-frequency base station and in a beam training process, the high-frequency base station determines an optimal receiving wide beam of the high-frequency base station and an optimal sending narrow beam of the user equipment by detecting, on each receiving wide beam of the high-frequency base station, the non-contention-based sequence sent by the user equipment.

903. The high-frequency base station sends a second random access response message to the user equipment, where the second random access response message includes information about the optimal receiving wide beam of the high-frequency base station and the optimal sending narrow beam of the user equipment.

In the process in which the user equipment performs initial random access to the high-frequency base station, the high-frequency base station allocates the non-contention-based sequence to the user equipment, and sends the non-contention-based sequence to the user equipment by using the first random access response message. After the user equipment completes the initial random access to the high-frequency base station and in the beam training process, the high-frequency base station switches between receiving wide beams and detects the non-contention-based sequence sent by the user equipment, to determine the optimal receiving wide beam of the high-frequency base station and the optimal sending narrow beam of the user equipment. The high-frequency base station sends a second random access response message including an optimal receiving wide beam of the high-frequency base station and an optimal sending narrow beam of the user equipment that are re-determined by the high-frequency base station to the user equipment. In the entire process, initial random access and subsequent beam training of the user equipment can be implemented on a random access resource of a high-frequency communications system. This controls system overheads and ensures precision of beam training, thereby improving performance of the high-frequency communications system.

For a specific implementation process in this embodiment, refer to the foregoing interaction embodiment. Details are not described herein again.

Figure 10:
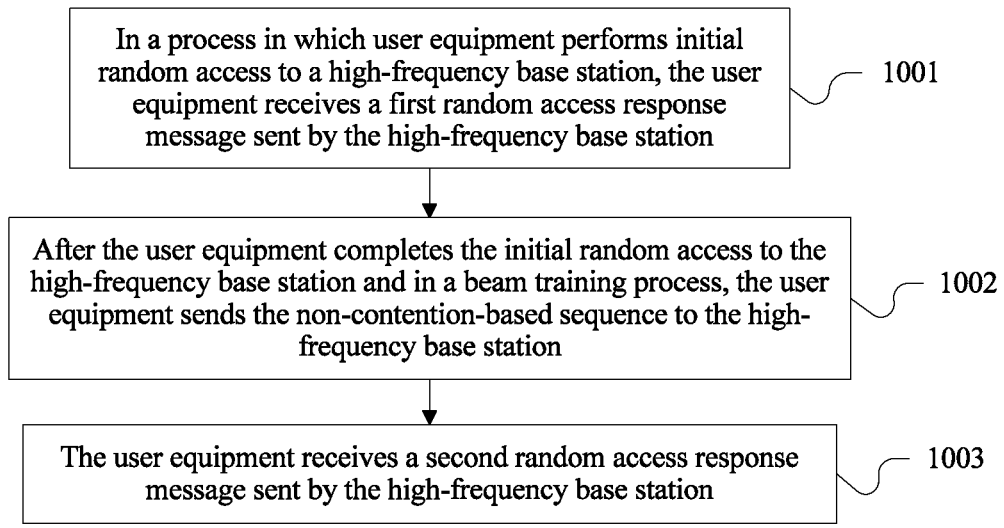
FIG. 10 is a schematic diagram of another embodiment of an uplink access method according to this application.

Referring to FIG. 10, another embodiment of the uplink access method in this application includes:

1001. In a process in which user equipment performs initial random access to a high-frequency base station, the user equipment receives a first random access response message sent by the high-frequency base station, where the first random access response message includes a non-contention-based sequence allocated by the high-frequency base station to the user equipment.

1002. After the user equipment completes the initial random access to the high-frequency base station and in a beam training process, the user equipment sends the non-contention-based sequence to the high-frequency base station.

1003. The user equipment receives a second random access response message sent by the high-frequency base station, where the second random access response message is sent to the user equipment when the high-frequency base station detects the non-contention-based sequence, the second random access response message includes information about an optimal receiving wide beam of the high-frequency base station and an optimal sending narrow beam of the user equipment, and the optimal receiving wide beam of the high-frequency base station and the optimal sending narrow beam of the user equipment are determined by the high-frequency base station by detecting, on each receiving wide beam, the non-contention-based sequence sent by the user equipment.

In the process in which the user equipment performs initial random access to the high-frequency base station, the user equipment receives the non-contention-based sequence allocated by the high-frequency base station. After the user equipment completes the initial random access to the high-frequency base station and in the beam training process, the user equipment sends the non-contention-based sequence to the high-frequency base station, so that the high-frequency base station determines the optimal receiving wide beam of the high-frequency base station and the optimal sending narrow beam of the user equipment, and sends the optimal receiving wide beam of the high-frequency base station and the optimal sending narrow beam of the user equipment to the user equipment by using the second random access response message. The user equipment receives the second random access response message sent by the high-frequency base station. In the entire process, initial random access and subsequent beam training of the user equipment can be implemented on a random access resource of a high-frequency communications system. This controls system overheads and ensures precision of beam training, thereby improving performance of the high-frequency communications system.

For a specific implementation process in this embodiment, refer to the foregoing interaction embodiment. Details are not described herein again.

The following describes an embodiment of a high-frequency base station in this application.

Figure 11:
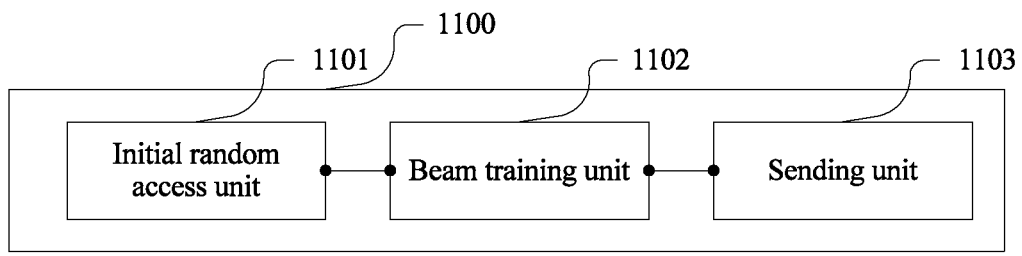
FIG. 11 is a schematic diagram of an embodiment of a high-frequency base station according to this application.

Referring to FIG. 11, an embodiment of a high-frequency base station 1100 in this application includes:

an initial random access unit 1101, configured to: in a process in which user equipment performs initial random access to a high-frequency base station, allocate a non-contention-based sequence to the user equipment, and send the non-contention-based sequence to the user equipment by using a first random access response message;

a beam training unit 1102, configured to: after the user equipment completes the initial random access to the high-frequency base station and in a beam training process, determine an optimal receiving wide beam of the high-frequency base station and an optimal sending narrow beam of the user equipment by detecting, on each receiving wide beam of the high-frequency base station, the non-contention-based sequence sent by the user equipment; and a sending unit 1103, configured to send a second random access response message to the user equipment by using the optimal receiving wide beam of the high-frequency base station, where the second random access response message includes information about the optimal receiving wide beam of the high-frequency base station and the optimal sending narrow beam of the user equipment.

In the process in which the user equipment performs initial random access to the high-frequency base station, the initial random access unit 1101 allocates the non-contention-based sequence to the user equipment, and sends the non-contention-based sequence to the user equipment by using the first random access response message. After the user equipment completes the initial random access to the high-frequency base station and in the beam training process, the beam training unit 1102 switches between receiving wide beams and detects the non-contention-based sequence sent by the user equipment, to determine the optimal receiving wide beam of the high-frequency base station and the optimal sending narrow beam of the user equipment. The sending unit 1103 sends the second random access response message including an optimal receiving wide beam of the high-frequency base station and an optimal sending narrow beam of the user equipment that are re-determined by the high-frequency base station to the user equipment. In the entire process, initial random access and subsequent beam training of the user equipment can be implemented on a random access resource of a high-frequency communications system. This controls system overheads and ensures precision of beam training, thereby improving performance of the high-frequency communications system.

Optionally, the beam training unit 1102 is specifically configured to:

detect, on each receiving wide beam of the high-frequency base station, the non-contention-based sequence sent by the user equipment;

determine that a receiving wide beam of the high-frequency base station that is corresponding to the non-contention-based sequence with a highest received signal strength is the optimal receiving wide beam of the high-frequency base station; and determine that a sending narrow beam corresponding to the optimal receiving wide beam of the high-frequency base station is the optimal sending narrow beam of the user equipment.

Optionally, the beam training unit 1102 is specifically configured to: detect, in an uplink random access/beam-training period ULBP of a special subframe of a radio frame and on each receiving wide beam of the high-frequency base station, the non-contention-based sequence sent by the user equipment, where at least one special subframe is preset in the radio frame, and at least one ULBP is reserved in the special subframe to receive a preamble sequence.

Optionally, in the beam training process and before the high-frequency base station detects the non-contention-based sequence sent by the user equipment, the sending unit 1103 sends a synchronization signal to the user equipment by using different wide beams, so that the user equipment determines an optimal sending wide beam of the user equipment, sequentially switches, in time slices corresponding to different receiving wide beams of the high-frequency base station, between narrow beams in the optimal sending wide beam of the user equipment, and sends the non-contention-based sequence, where a receiving wide beam of the high-frequency base station is in a one-to-one correspondence with a time slice.

The beam training unit 1102 is specifically configured to: determine a target time slice corresponding to the optimal receiving wide beam of the high-frequency base station, and determine that a sending narrow beam used for sending the non-contention-based sequence in the target time slice is the optimal sending narrow beam of the user equipment.

Optionally, before the process in which the user equipment performs initial random access to the high-frequency base station, the user equipment has successfully accessed a low-frequency base station.

The high-frequency base station further includes:

an access unit, configured to receive a unique access preamble sequence that is allocated to the user equipment and that is sent by the low-frequency base station, where when receiving the access preamble sequence sent by the user equipment, it indicates that the user equipment successfully accesses the high-frequency base station.

The following describes an embodiment of user equipment in this application.

Figure 12:
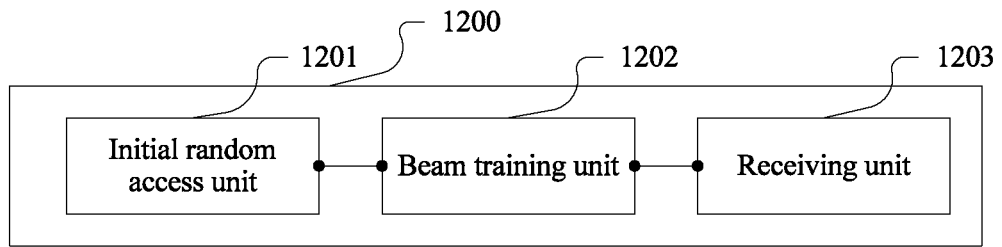
FIG. 12 is a schematic diagram of an embodiment of user equipment according to this application.

Referring to FIG. 12, an embodiment of user equipment 1200 provided in this application includes:

an initial random access unit 1201, configured to: in a process in which user equipment performs initial random access to a high-frequency base station, receive a first random access response message sent by the high-frequency base station, where the first random access response message includes a non-contention-based sequence allocated by the high-frequency base station to the user equipment;

a beam training unit 1202, configured to: after the user equipment completes the initial random access to the high-frequency base station and in a beam training process, send the non-contention-based sequence to the high-frequency base station; and a receiving unit 1203, configured to: receive a second random access response message sent by the high-frequency base station, where the second random access response message is sent to the user equipment when the high-frequency base station detects the non-contention-based sequence, the second random access response message includes information about an optimal receiving wide beam of the high-frequency base station and an optimal sending narrow beam of the user equipment, and the optimal receiving wide beam of the high-frequency base station and the optimal sending narrow beam of the user equipment are determined by the high-frequency base station by detecting, on each receiving wide beam, the non-contention-based sequence sent by the user equipment.

In the process in which the user equipment performs initial random access to the high-frequency base station, the initial random access unit 1201 receives the non-contention-based sequence allocated by the high-frequency base station. After the user equipment completes the initial random access to the high-frequency base station and in the beam training process, the beam training unit 1202 sends the non-contention-based sequence to the high-frequency base station, so that the high-frequency base station determines the optimal receiving wide beam of the high-frequency base station and the optimal sending narrow beam of the user equipment, and sends the optimal receiving wide beam of the high-frequency base station and the optimal sending narrow beam of the user equipment to the user equipment by using the second random access response message. The receiving unit 1203 receives the second random access response message sent by the high-frequency base station. In the entire process, initial random access and subsequent beam training of the user equipment can be implemented on a random access resource of a high-frequency communications system. This controls system overheads and ensures precision of beam training, thereby improving performance of the high-frequency communications system.

Optionally, the beam training unit 1202 is specifically configured to: determine an optimal receiving wide beam of the user equipment; and separately send the non-contention-based sequence to the high-frequency base station by using narrow beams in the optimal receiving wide beam of the user equipment.

Optionally, the beam training unit 1202 is specifically configured to:

switch between receiving beams and perform synchronization signal detection to determine an optimal sending wide beam of the high-frequency base station and the optimal receiving wide beam of the user equipment, where the synchronization signal is sent by the high-frequency base station; and sequentially switch, in time slices corresponding to different receiving wide beams of the high-frequency base station, between narrow beams in the optimal receiving wide beam of the user equipment, and send the non-contention-based sequence, so that the high-frequency base station determines the optimal receiving wide beam of the high-frequency base station and the optimal sending narrow beam of the user equipment, where a receiving wide beam of the high-frequency base station is in a one-to-one correspondence with a time slice.

Optionally, the beam training unit 1202 is specifically configured to: sequentially switch, in a ULBP of a special subframe of a radio frame and in a time slice corresponding to an optimal receiving wide beam of the high-frequency base station, between narrow beams in the optimal receiving wide beam of the user equipment, and send the non-contention-based sequence, where at least one special subframe is preset in the radio frame, and at least one ULBP is reserved in the special subframe to send a preamble sequence.

Optionally, before the process in which the user equipment performs initial random access to the high-frequency base station, the user equipment has successfully accessed a low-frequency base station.

The user equipment further includes:

an access unit, configured to: before the user equipment performs initial random access to the high-frequency base station, send a random access request used to request access to the high-frequency base station to the low-frequency base station, where the random access request includes a cell identity used by the low-frequency base station to request access to the high-frequency base station; receive a second random preamble sequence sent by the low-frequency base station, where the second random preamble sequence is allocated to the user equipment by using the cell identity of the high-frequency base station after the low-frequency base station receives the random access request; and access the high-frequency base station by using the second random preamble sequence.

Figure 13:
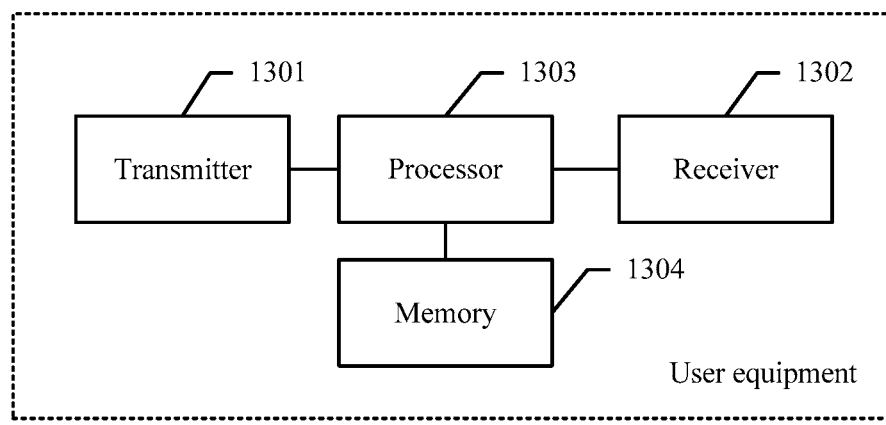
FIG. 13 is a schematic diagram of an embodiment of a high-frequency base station according to this application.

The foregoing has described the user equipment in this application from a perspective of a cellular functional entity. The following describes the user equipment in this application from a perspective of hardware processing. Referring to FIG. 13, user equipments in this application include: a transmitter 1301, a receiver 1302, one or more processors 1303, and a memory 1304.

The user equipment used in this application may have more or fewer parts than those shown in FIG. 13, may combine two or more parts, or may have different part configurations or settings. Various parts may be implemented in hardware including one or more signal processing and/or application-specific integrated circuits, in software, or in a combination of hardware and software.

The receiver 1302 is configured to perform the following operation:

in a process in which user equipment performs initial random access to a high-frequency base station, receive a first random access response message sent by the high-frequency base station, where the first random access response message includes a non-contention-based sequence allocated by the high-frequency base station to the user equipment.

After the user equipment completes the initial random access to the high-frequency base station and in a beam training process, the transmitter 1301 is configured to perform the following operation:

send the non-contention-based sequence to the high-frequency base station.

The receiver 1302 is further configured to perform the following operation:

receive a second random access response message sent by the high-frequency base station, where the second random access response message is sent to the user equipment when the high-frequency base station detects the non-contention-based sequence, the second random access response message includes information about an optimal receiving wide beam of the high-frequency base station and an optimal sending narrow beam of the user equipment, and the optimal receiving wide beam of the high-frequency base station and the optimal sending narrow beam of the user equipment are determined by the high-frequency base station by detecting, on each receiving wide beam, the non-contention-based sequence sent by the user equipment.

Optionally, the processor 1303 is specifically configured to perform the following step:

determine an optimal receiving wide beam of the user equipment.

The transmitter 1301 is specifically configured to perform the following operation:

separately send the non-contention-based sequence to the high-frequency base station by using narrow beams in the optimal receiving wide beam of the user equipment.

Optionally, the processor 1303 is specifically configured to perform the following step:

switch between receiving beams and perform synchronization signal detection to determine an optimal sending wide beam of the high-frequency base station and the optimal receiving wide beam of the user equipment, where the synchronization signal is sent by the high-frequency base station.

The transmitter 1301 is specifically configured to perform the following operation:

sequentially switch, in time slices corresponding to different receiving wide beams of the high-frequency base station, between narrow beams in the optimal receiving wide beam of the user equipment, and send the non-contention-based sequence, so that the high-frequency base station determines the optimal receiving wide beam of the high-frequency base station and the optimal sending narrow beam of the user equipment, where a receiving wide beam of the high-frequency base station is in a one-to-one correspondence with a time slice.

Optionally, the transmitter 1301 is specifically configured to perform the following operation:

sequentially switch, in a ULBP of a special subframe of a radio frame and in time slices corresponding to different receiving wide beams of the high-frequency base station, between narrow beams in the optimal receiving wide beam of the user equipment, and send the non-contention-based sequence, where at least one special subframe is preset in the radio frame, and at least one ULBP is reserved in the special subframe to send a preamble sequence.

Optionally, before the process in which the user equipment performs initial random access to the high-frequency base station, the user equipment has successfully accessed a low-frequency base station.

The transmitter 1301 is further configured to perform the following operation:

before the process in which the user equipment performs initial random access to the high-frequency base station, send a random access request used to request access to the high-frequency base station to the low-frequency base station, where the random access request includes a cell identity used by the low-frequency base station to request access to the high-frequency base station.

The receiver 1302 is further configured to perform the following operation:

receive a second random preamble sequence sent by the low-frequency base station, where the second random preamble sequence is allocated to the user equipment by using the cell identity of the high-frequency base station after the low-frequency base station receives the random access request; and access the high-frequency base station by using the second random preamble sequence.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

It should be noted that, to make the description brief, the foregoing method embodiments are expressed as a series of actions. However, persons skilled in the art should appreciate that the present invention is not limited to the described action sequence, because according to the present invention, some steps may be performed in other sequences or performed simultaneously. In addition, persons skilled in the art should also appreciate that all the embodiments described in the specification are example embodiments, and the related actions and modules are not necessarily mandatory to the present invention.

In the foregoing embodiments, the description of each embodiment has respective focuses. For a part that is not described in detail in an embodiment, refer to related descriptions in other embodiments.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A high-frequency base station, comprising:
   a processor configured to:
      allocate a non-contention-based sequence to a user equipment that performs initial random access to the high-frequency base station;
   a transmitter communicatively coupled with the processor and is configured to:
      send the non-contention-based sequence to the user equipment by using a first random access response message; and wherein
   the processor is further configured to:
      during a beam training process, detect, on each receiving wide beam of the high-frequency base station, the non-contention-based sequence sent by the user equipment; and
      determine an optimal receiving wide beam of the high-frequency base station and an optimal sending narrow beam of the user equipment based on the detecting, wherein the optimal receiving wide beam is determined by selecting a receiving wide beam that is corresponding to the non-contention-based sequence with a highest received signal strength as the optimal receiving wide beam, and the optimal sending narrow beam is determined by selecting a sending narrow beam corresponding to the optimal receiving wide beam as the optimal sending narrow beam; and
   the transmitter is further configured to:
      send a second random access response message to the user equipment by using the optimal receiving wide beam of the high-frequency base station, wherein the second random access response message comprises information about the optimal receiving wide beam of the high-frequency base station and the optimal sending narrow beam of the user equipment.

2. The high-frequency base station according to claim 1, wherein:
   the processor is configured to:
      detect, in an uplink random access/beam-training period (ULBP) of a special subframe of a radio frame and on each receiving wide beam of the high-frequency base station, the non-contention-based sequence sent by the user equipment, wherein at least one special subframe is preset in the radio frame, and at least one ULBP is reserved in the special subframe to receive a preamble sequence.

3. The high-frequency base station according to claim 1, wherein:
   the transmitter is configured to:
      during the beam training process and before the processor detecting the non-contention-based sequence sent by the user equipment, send a synchronization signal to the user equipment by using different wide beams, wherein the user equipment determines an optimal sending wide beam of the user equipment, the user equipment sequentially switches, in time slices corresponding to different receiving wide beams of the high-frequency base station, between narrow beams in the optimal sending wide beam of the user equipment, the user equipment sends the non-contention-based sequence, and a receiving wide beam of the high-frequency base station is in a one-to-one correspondence with a time slice; and
   the processor is configured to:
      determine a target time slice corresponding to the optimal receiving wide beam of the high-frequency base station; and
      determine that a sending narrow beam used for sending the non-contention-based sequence in the target time slice is the optimal sending narrow beam of the user equipment.

4. User equipment, comprising:
   a receiver, configured to:
      in an initial random access to a high-frequency base station, receive a first random access response message sent by the high-frequency base station, wherein the first random access response message comprises a non-contention-based sequence allocated by the high-frequency base station to the user equipment;
   a transmitter, configured to:
      after the user equipment completes the initial random access to the high-frequency base station, during a beam training process, send the non-contention-based sequence to the high-frequency base station; and wherein
   the receiver is configured to:
      receive a second random access response message sent by the high-frequency base station, wherein the second random access response message comprises information about an optimal receiving wide beam of the high-frequency base station and an optimal sending narrow beam of the user equipment, and the optimal receiving wide beam of the high-frequency base station and the optimal sending narrow beam of the user equipment are determined by the high-frequency base station by selecting a receiving wide beam that is corresponding to the non-contention-based sequence with a highest received signal strength as the optimal receiving wide beam, and the optimal sending narrow beam is determined by selecting a sending narrow beam corresponding to the optimal receiving wide beam as the optimal sending narrow beam.

5. The user equipment according to claim 4, further comprising:
a processor, configured to determine an optimal receiving wide beam of the user equipment; and
wherein the transmitter is configured to:
send the non-contention-based sequence to the high-frequency base station by using narrow beams in the optimal receiving wide beam of the user equipment.

6. The user equipment according to claim 5, wherein:
the processor is configured to:
switch between receiving beams and perform synchronization signal detection to determine an optimal sending wide beam of the high-frequency base station and the optimal receiving wide beam of the user equipment, wherein the synchronization signal is sent by the high-frequency base station; and
the transmitter is configured to:
sequentially switch, in time slices corresponding to different receiving wide beams of the high-frequency base station, between narrow beams in the optimal receiving wide beam of the user equipment; and
send the non-contention-based sequence, wherein a receiving wide beam of the high-frequency base station is in a one-to-one correspondence with a time slice.

7. The user equipment according to claim 6, wherein:
the transmitter is configured to:
sequentially switch, in an uplink random access/beam-training period (ULBP) of a special subframe of a radio frame and in a time slice corresponding to an optimal receiving wide beam of the high-frequency base station, between narrow beams in the optimal receiving wide beam of the user equipment; and
send the non-contention-based sequence, wherein at least one special subframe is preset in the radio frame, and at least one ULBP is reserved in the special subframe to send a preamble sequence.

8. An uplink access method, comprising:
allocating, by a high-frequency base station, a non-contention-based sequence to a user equipment that performs an initial random access to the high-frequency base station;
sending the non-contention-based sequence to the user equipment by using a first random access response message;
during a beam training process, detecting, by the high-frequency base station, on each receiving wide beam of the high-frequency base station, the non-contention-based sequence sent by the user equipment;
determining, by the high-frequency base station, an optimal receiving wide beam of the high-frequency base station and an optimal sending narrow beam of the user equipment based on the detecting, wherein the optimal receiving wide beam is determined by selecting a receiving wide beam that is corresponding to the non-contention-based sequence with a highest received signal strength as the optimal receiving wide beam, and the optimal sending narrow beam is determined by selecting a sending narrow beam corresponding to the optimal receiving wide beam as the optimal sending narrow beam; and
sending, by the high-frequency base station, a second random access response message to the user equipment, wherein the second random access response message comprises information about the optimal receiving wide beam of the high-frequency base station and the optimal sending narrow beam of the user equipment.

9. The method according to claim 8, wherein the detecting, by the high-frequency base station on each receiving wide beam of the high-frequency base station, the non-contention-based sequence sent by the user equipment comprises:
detecting, by the high-frequency base station in an uplink random access/beam-training period (ULBP) of a special subframe of a radio frame and on each receiving wide beam of the high-frequency base station, the non-contention-based sequence sent by the user equipment, wherein at least one special subframe is preset in the radio frame, and at least one ULBP is reserved in the special subframe to receive a preamble sequence.

10. The method according to claim 8, wherein the method comprises:
during the beam training process and before the detecting, by the high-frequency base station, the non-contention-based sequence sent by the user equipment, sending, by the high-frequency base station, a synchronization signal to the user equipment by using different wide beams, wherein the user equipment determines an optimal receiving wide beam of the user equipment, the user equipment sequentially switches, in time slices corresponding to different receiving wide beams of the high-frequency base station, between narrow beams in the optimal receiving wide beam of the user equipment, the user equipment sends the non-contention-based sequence, and a receiving wide beam of the high-frequency base station is in a one-to-one correspondence with a time slice; and wherein
the determining, by the high-frequency base station, that the sending narrow beam corresponding to the optimal receiving wide beam of the high-frequency base station is the optimal sending narrow beam of the user equipment comprises:
determining, by the high-frequency base station, a target time slice corresponding to the optimal receiving wide beam of the high-frequency base station; and
determining that a sending narrow beam used for sending the non-contention-based sequence in the target time slice is the optimal sending narrow beam of the user equipment.

11. An uplink access method, comprising:
in an initial random access to a high-frequency base station, receiving, by a user equipment, a first random access response message sent by the high-frequency base station, wherein the first random access response message comprises a non-contention-based sequence allocated by the high-frequency base station to the user equipment;
after the user equipment completes the initial random access to the high-frequency base station, during a beam training process, sending, by the user equipment, the non-contention-based sequence to the high-frequency base station; and receiving, by the user equipment, a second random access response message sent by the high-frequency base station, wherein the second random access response message comprises information about an optimal receiving wide beam of the high-frequency base station and an optimal sending narrow beam of the user equipment, and the optimal receiving wide beam of the high-frequency base station and the optimal sending narrow beam of the user equipment are determined by the high-frequency base station by selecting a receiving wide beam that is corresponding to the non-contention-based sequence with a highest received signal strength as the optimal receiving wide beam, and the optimal sending narrow beam is determined by selecting a sending narrow beam corresponding to the optimal receiving wide beam as the optimal sending narrow beam.

12. The method according to claim 11, wherein: the sending, by the user equipment, the non-contention-based sequence to the high-frequency base station comprises:

determining, by the user equipment, an optimal receiving wide beam of the user equipment; and separately sending, by the user equipment, the non-contention-based sequence to the high-frequency base station by using narrow beams in the optimal receiving wide beam of the user equipment.

13. The method according to claim 12, wherein the determining, by the user equipment, the optimal receiving wide beam of the user equipment comprises:

switching, by the user equipment, between receiving beams; and performing synchronization signal detection to determine an optimal sending wide beam of the high-frequency base station and the optimal receiving wide beam of the user equipment, wherein the synchronization signal is sent by the high-frequency base station; and wherein the separately sending the non-contention-based sequence to the high-frequency base station by using narrow beams in the optimal receiving wide beam of the user equipment comprises:

sequentially switching, by the user equipment in time slices corresponding to different receiving wide beams of the high-frequency base station, between the narrow beams in the optimal receiving wide beam of the user equipment; and sending the non-contention-based sequence, wherein a receiving wide beam of the high-frequency base station is in a one-to-one correspondence with a time slice.

14. The method according to claim 13, wherein the sequentially switching, by the user equipment in time slices corresponding to different receiving wide beams of the high-frequency base station, between narrow beams in the optimal receiving wide beam of the user equipment, and sending the non-contention-based sequence comprises:

sequentially switching, by the user equipment in an uplink random access/beam-training period (ULBP) of a special subframe of a radio frame and in time slices corresponding to different receiving wide beams of the high-frequency base station, between the narrow beams in the optimal receiving wide beam of the user equipment; and sending the non-contention-based sequence, wherein at least one special subframe is preset in the radio frame, and at least one ULBP is reserved in the special subframe to send a preamble sequence.

* * * * *